April 28, 1953  J. J. FEDEVICH  2,636,213
APPARATUS FOR REMOVING CASINGS FROM WIENERS AND THE LIKE
Filed Feb. 20, 1950  3 Sheets-Sheet 1

INVENTOR.
Joseph J. Fedevich
BY
*Freese and Bialy*
ATTORNEYS

April 28, 1953  J. J. FEDEVICH  2,636,213
APPARATUS FOR REMOVING CASINGS FROM WIENERS AND THE LIKE
Filed Feb. 20, 1950  3 Sheets-Sheet 2

INVENTOR.
Joseph J. Fedevich
BY
ATTORNEYS

April 28, 1953    J. J. FEDEVICH    2,636,213
APPARATUS FOR REMOVING CASINGS FROM WIENERS AND THE LIKE
Filed Feb. 20, 1950    3 Sheets-Sheet 3
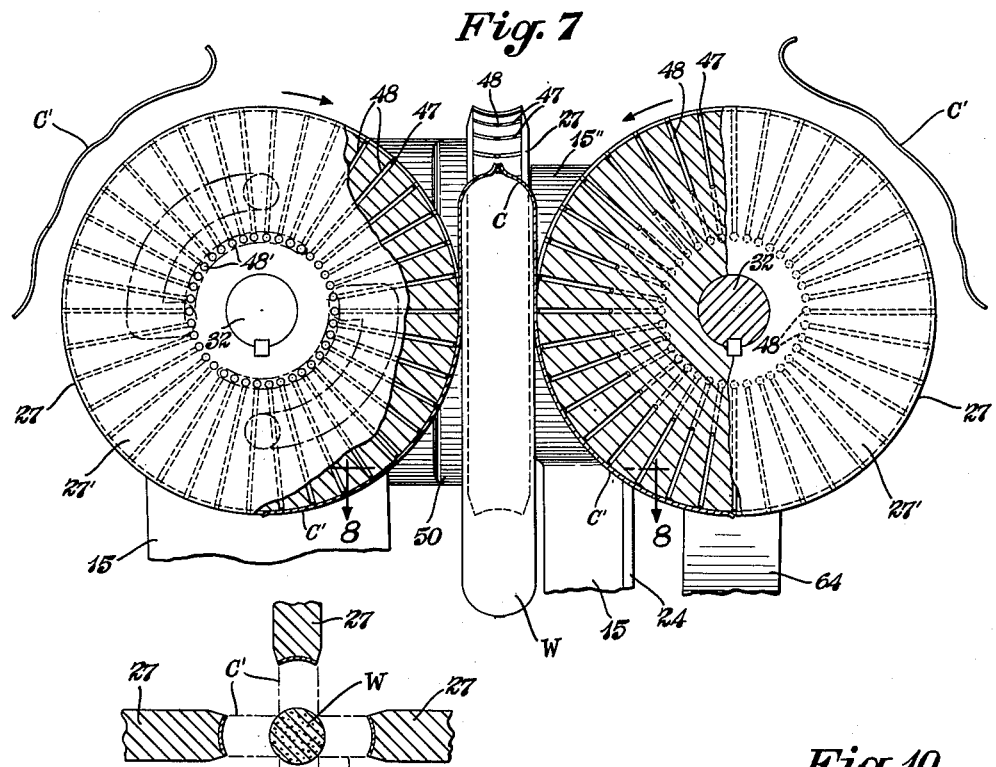
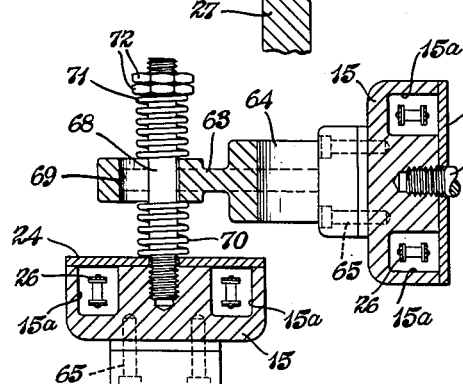
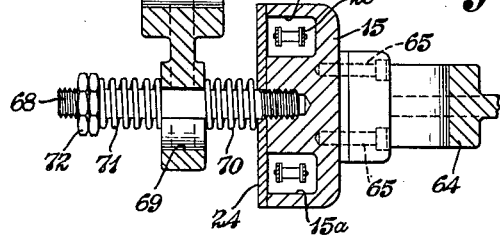
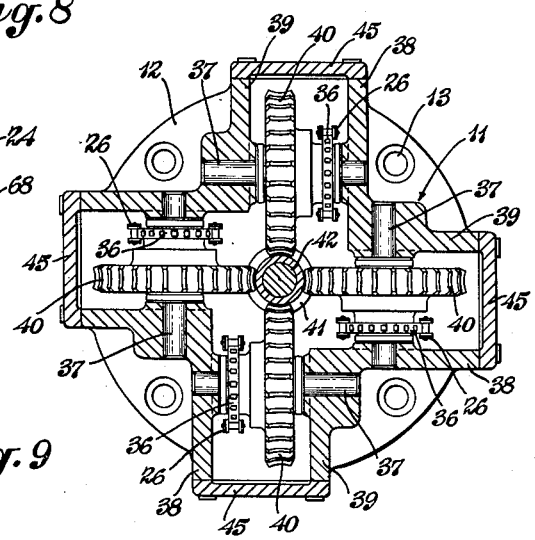
INVENTOR.
Joseph J. Fedevich
BY
*Freass and Bisley*
ATTORNEYS Patented Apr. 28, 1953

2,636,213

UNITED STATES PATENT OFFICE 2,636,213

APPARATUS FOR REMOVING CASINGS FROM WIENERS AND THE LIKE

Joseph J. Fedevich, Canton, Ohio

Application February 20, 1950, Serial No. 145,129

8 Claims. (Cl. 17—1)

The invention relates generally to the removal of casings from meat products, and more particularly to the removal of cellophane casings from wieners, frankfurters, sausages and the like, in the manufacture of the skinless variety of such products.

Ordinarily, the cellophane casings are peeled or stripped from the meat by hand after the wieners have been treated or par-boiled, and this manual operation is not only very costly and tedious but also unsanitary because of the large amount of handling to which the wieners are subjected.

It is an object of the invention to provide a compact and inexpensive machine which does not require slitting or scoring of the cellophane casing lengthwise before stripping it from the wiener, as this mars or scores the surface of the wiener so as to render it unacceptable to the trade.

It is a general object of the present invention to provide a novel apparatus for removing cellophane casings from wieners and like products, without in any way marring or damaging the surface or compactness of the meat within the casing.

Another and more specific object is to provide a novel apparatus for removing the casings without first injecting air into the same and without first scoring or slitting the casings lengthwise of the wieners.

Another object is to provide a novel and improved machine for removing the casings from wieners by stripping or peeling off adjoining strips making up the entire casing, simultaneously.

A further object is to provide a novel and improved machine which removes adjoining strips of the casing by vacuum and then blows the removed strips laterally out of the machine.

Another object is to provide a novel and improved machine having radially disposed vacuum rolls for removing adjoining strips of the casings of wieners passing between the rolls, said rolls being automatically self-adjusting relative to each other to compensate for dimensional variations in the wieners.

A still further object is to provide a novel and improved wiener skinning machine which is compact and relatively inexpensive to build, which requires no difficult and fine adjustments, and which is easy to disassemble and repair.

These and other objects are accomplished by the novel parts, elements, combinations, and apparatus comprising the present invention, a preferred embodiment of said apparatus being shown in the accompanying drawings as exemplifying the best known mode of carrying out the invention, the invention being set forth in general terms in the following statement and described in detail in the specification, and the scope of the invention being defined in the appended claims.

In general terms, the novel machine of the present invention generally comprises a fixed gear housing having preferably four upright arms pivoted thereon for yielding radial movement to and from each other, there being radially disposed grooved wheels journaled on the arms for rollably engaging the entire circumference of an encased wiener at their adjoining inner peripheries, said wheels being adapted to peel off adjoining longitudinal strips of the casing by suction during a partial rotation and to blow said removed strips outwardly during a subsequent partial rotation, the wheels being rotated simultaneously by gears journaled in said gear housing, and means being provided for conducting the skinned wieners from the peeling wheels downwardly and outwardly between the upright arms.

Referring to the drawings forming part hereof, in which a preferred embodiment of the novel apparatus is shown by way of example;

Fig. 7 is an enlarged sectional view substantially on line 7—7, Fig. 6, the relative location of the arcuate vacuum and air grooves being shown in dot-dash lines;

Fig. 8 is a fragmentary plan sectional view as on line 8—8, Fig. 7, showing the method of peeling the adjoining strips simultaneously from a wiener;

Fig. 9 is an enlarged fragmentary sectional view as on line 9—9, Fig. 1; and

Fig. 10 is a transverse sectional view as on line 10—10, Fig. 1.

Similar numerals refer to similar parts throughout the drawings.

Figure 1:
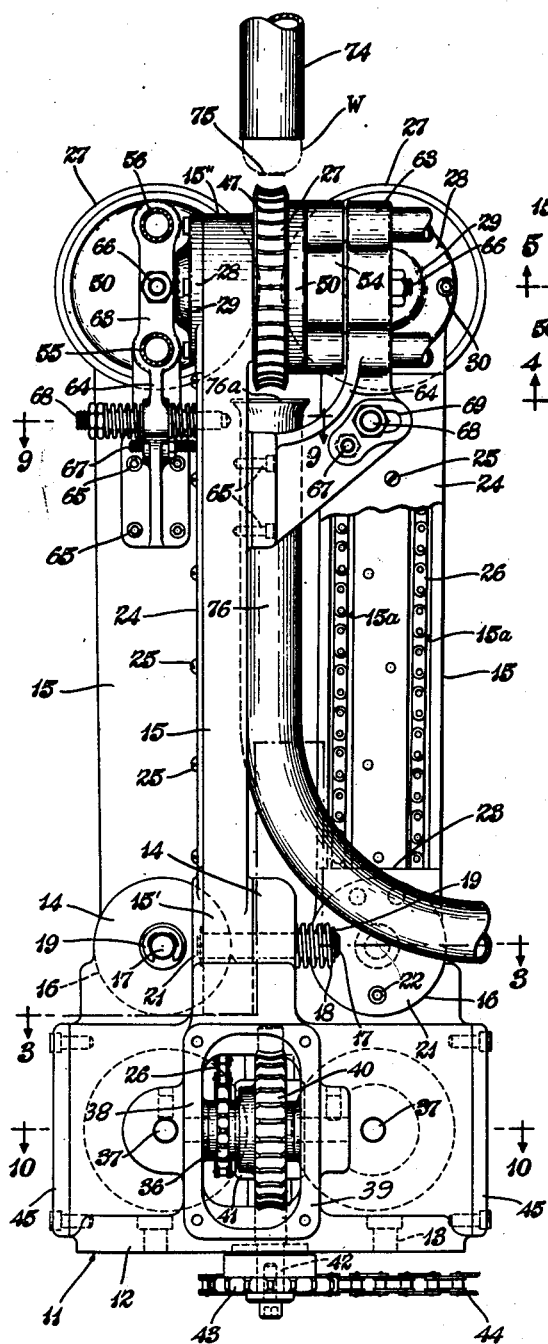
Figure 1 is a side elevation of the improved machine, with parts removed and parts broken away.

The novel machine preferably includes a gear housing indicated generally at 11 at its lower end, and said gear housing is suitably supported in fixed position upon a base frame or table (not shown). As best shown in Fig. 10, the bottom portion 12 of the housing is provided with circumferentially arranged bolt holes 13 for securing the housing to its support.

The upper portion of the housing 11 is provided with a plurality of radially arranged upwardly projecting bracket ears 14 on which the upright arms are pivotally supported, there being preferably four of the ears 14 for supporting four upright arms 15 at right angles to each other. Each bracket ear 14 preferably has a recessed portion on one side with an arcuate bottom wall 16, and the curved bottom ends 15' of the upright arms 15 fit into the recesses and are rotatably clamped against the flat surfaces 14' of the ears 14.

Preferably each arm 15 is journaled on a pivot pin 17 which extends through the adjacent ear 14, and the lower end 15' of the arm is yieldingly clamped against the ear by means of a compression spring 18 which is held under compression against the ear by means of a split retaining washer 19. The other end of the pin 17 is retained in the arm by means of a retaining washer 20, and preferably a cap piece 21 fits over the washer and is secured to the lower end 15' of the arm by means of screws 22. The upper edge 23 of each cap piece 21 is cut off square as indicated in Fig. 1, and forms an abutment for the lower squared edge of a cover plate 24 attached to one side of each arm by means of machine screws 25.

Each of the arms 15 has a pair of longitudinal channels 15a therein for the two runs of an endless chain 26 which extends through holes 14a in the associated ear 14, and which is driven from the gear housing and drives one of the radially disposed peeling wheels 27 journaled at the top of the machine. In the embodiment illustrated, there are four wheels 27 journaled on four arms 15, but it will be understood that it is within the scope of the invention to vary the number of radially arranged peeling wheels and the arms carrying the same.

Figure 2:
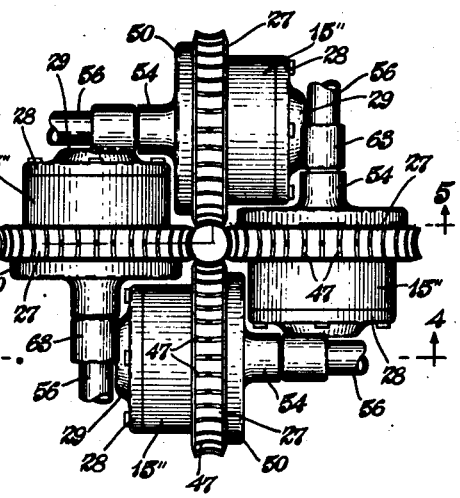
Fig. 2 is a plan elevation thereof.
Figure 3:
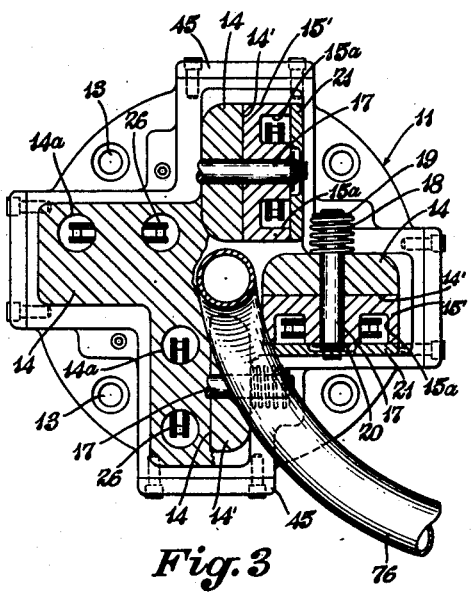
Fig. 3 is a transverse sectional view substantially on line 3—3, Fig. 1 with the tube shown in full lines.
Figure 4:
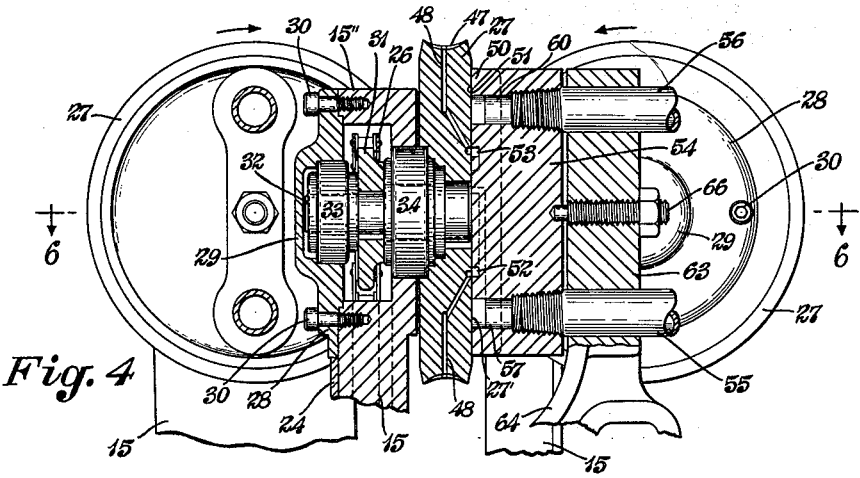
Fig. 4 is an enlarged fragmentary sectional view of the upper part of the machine, as on line 4—4, Fig. 2.
Figure 6:
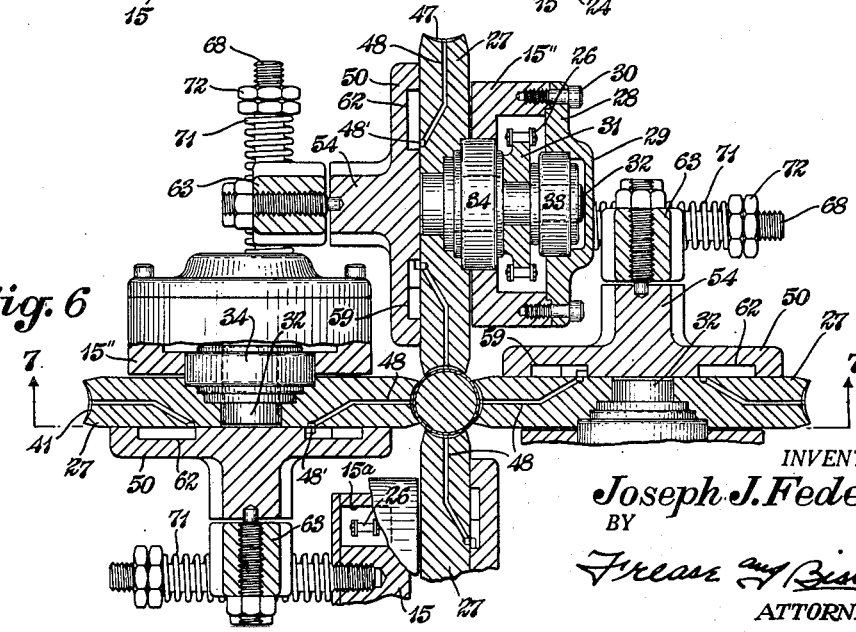
Fig. 6 is a fragmentary plan sectional view as on line 6—6, Fig. 4.

As best shown in Figs. 1 and 2, the upper ends 15'' of the arms 15 are hollow and rounded or semi-cylindrical, and a cap plate 28 having an embossed central portion 29 is attached to one side of each arm at its top end by screws 30, the lower edge of the cap plate being squared off to abut the upper edge of the cover plate 24. Thus the cap plate 28 may be removed to give access to the upper sprocket wheel 31 within the hollow upper portion of each arm, the sprocket being driven by the chain 26, as best shown in Figs. 4 and 6. Preferably, each sprocket 31 is mounted on a shaft 32 which is journaled in anti-friction bearings 33 and 34 mounted in the cap plate 28 and the upper end 15'' of the arm 15, respectively.

The peeling wheels 27 are mounted on the shafts 32 adjacent the bearings 34, and the shafts are arranged at right angles to each other, the opposite shafts being parallel, so that the inner peripheries of the four radially disposed wheels 27 normally come together to form substantially a complete circle cross sectionally of the wheels, as shown in Fig. 2. The shaft 32 in the upper end of each arm is parallel with the pivot shaft 17 in the lower end of said arm so that each wheel 27 is movable on the pivot shaft to and from the other wheels.

Referring to Fig. 10, the bottom ends of the chains 26 are driven by sprockets 36 which are mounted on shafts 37 disposed at right angles to each other and journaled in the vertical compartment walls 38 and 39 of the gear housing 11. The shafts 37 have worm gears 40 mounted thereon and the worm gears are driven by a vertical worm 41 which engages the adjacent inner peripheries of the worm gears. As shown in Fig. 1, the bottom end 42 of the worm shaft projects below the bottom portion 12 of the housing and has a sprocket 43 thereon which is driven by a chain 44 from a suitable source of power. Each worm gear compartment of the housing 11 is accessible through an outer opening normally closed by a cover plate 45.

The construction of each of the peeling wheels 27 is the same and only one need be described. The outer periphery of each wheel is grooved on a transverse radius as shown so that when the peripheries of the four wheels come together as in Fig. 2, a substantially complete circular opening is formed at the tangent points. The grooved periphery of each wheel is provided with a series of circumferentially spaced transverse grooves or slots 47 which, as shown in Figs. 4 and 6, die out or merge with the surface of the peripheral groove at the edges thereof.

A series of radial ducts 48 is formed within the wheel and each duct 48 communicates at its outer end with the middle of one of the slots 47. At their inner ends the ducts 48 are angled outwardly toward the flat outer surface 27' of the wheel and terminate in a circular series of ports 48' in said outer surface. An air cylinder 50 is provided for each wheel for alternately sucking air from the ports 48' and supplying air under pressure to the ports 48'. Each air cylinder has a flat polished surface 51 which slidably abuts the adjacent flat outer surface 27' of a wheel 27 in which the ports 48' are located, the outer surface of the wheel also being polished, so that air may be transmitted into and out of the holes 48' without leakage as the wheels rotate.

The surface 51 of each cylinder 50 is provided with a pair of disconnected arcuate grooves 52 and 53 (Fig. 5) on the same radius as the ports 48' in the wheels 27, so as to register therewith when the cylinder and the adjacent wheel 27 are in abutment. Means are provided in the cylinder 50 for connecting a source of vacuum to the groove 52 and for connecting the source of air pressure to the groove 53. Preferably, each air cylinder 50 is provided with a central vertically disposed boss 54 and a vacuum pipe 55 is screwed into the lower end of the boss and an air pipe 56 is screwed into the upper end. The inner end of the vacuum pipe 55 communicates through a hole 57 with one end of an enlarged arcuate groove 58 in the surface 51, the other end of which communicates through an offset 59 with one end of the vacuum groove 52. Similarly, the air pipe 56 communicates through a hole 60 with one end of an enlarged arcuate groove 61 in the surface 51, the other end of the groove 61 communicating through an offset 62 with one end of the air groove 53. Thus, as the wheels 27 rotate, the group of ports 48' which are in register with the groove 52 suck air from the peripheral portion of the wheel in communication with said ports, and the group of ports 48' in register with the groove 53 blow air out through the peripheral portion of the wheel in communication therewith.

Figure 5:
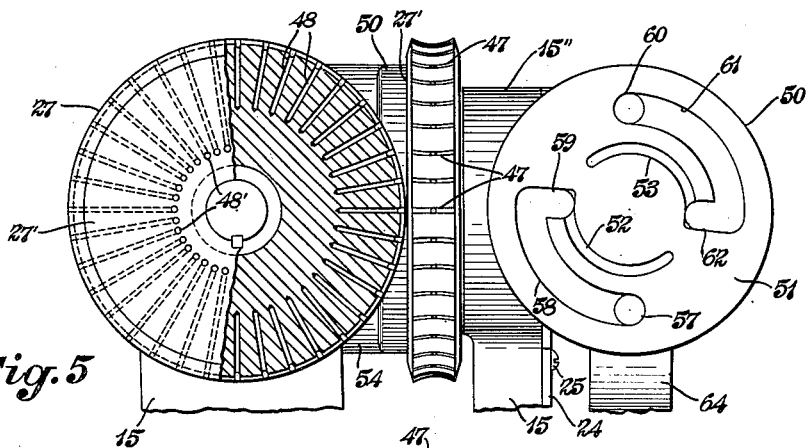
Fig. 5 is an enlarged fragmentary sectional view as on line 5—5, Fig. 2.

As shown in Fig. 5, and as indicated in dot-dash lines in Fig. 7, the upper ends of the vacuum grooves 52 and the offset connections therewith are located slightly above the tangent point where the four wheels come together, so that as a wiener W passes downwardly between the four wheels, vacuum will be applied to a peripheral portion of each wheel starting just above the tangent point where they come together and continuing around the periphery about 145°. Likewise, an opposite peripheral portion of about 145° will be supplied with a blast of air through the air groove 53. Thus any given point on the periphery of a wheel is supplied with vacuum as the wheel rotates through a partial rotation and with air pressure as the wheel rotates through a subsequent partial rotation.

The vacuum and air pipes 55 and 56 are preferably supported in a bracket arm 63 having a curved portion 64 which extends under the adjacent air cylinder 50 and is mounted at its lower end on the adjacent arm 15 by means of screws 65. The upper end of the bracket arm 63 preferably has an adjusting screw 66 extending through the arm and abutting the central part of the boss 54 for adjusting the pressure between the air cylinder and the outer face of the wheel 27. As shown in Fig. 1, each bracket arm 63 is provided with a stop screw 67 which abuts the cover plate 24 of the adjacent arm 15 at right angles to the arm 15 carrying the bracket when the wheel carried on the latter arm is at its innermost position shown in Fig. 2.

As best shown in Fig. 9, each bracket arm 63 carries spring means 70, 71 for yieldingly resisting oscillating movement of the arm on which the bracket is mounted about its pivot 17. Each adjusting means consists of rod or pin 68 extending through a slot 69 in the bracket at right angles to the bracket, and one end of the pin being screwed into the adjacent arm 15 which is disposed at right angles to the pin. Between the bracket 64 and the adjacent arm is a compression spring 70, and on the other side of the bracket is a stronger compression spring 71 held in place around the pin by adjusting nuts 72.

Thus the arm 15 at the top in Fig. 9 can oscillate on its pivot to cause the bracket 64 to move along the pin 68 against the yielding pressure of the springs 70 and 71. At the same time the next adjacent arm 15 at right angles to the top arm can oscillate on its pivot by movement of the upper pin 68 in the slot 69, and when this second arm oscillates its bracket 64 oscillates between the springs 70 and 71 at the bottom of Fig. 9. Thus, each arm 15 is yieldably movable or adjustable with respect to each other arm 15, so that the arms are self-adjusting to automatically accommodate themselves to variations in the diameter of wieners passed between the inner peripheries of the wheels.

In the operation of the novel and improved skinning machine, the wieners are fed downwardly through an upper tube 74, the axis of which is in alignment with the intersection of the central planes of the wheels 27. It will be understood that the wieners are discharged from the tube 74 in separated condition, that is, the cellophane casings have previously been severed between the wieners leaving an open cut-off portion such as indicated in Fig. 1 at 75 in the casing at the bottom end of the wiener, and a similar cut-off portion at its top end. The wheels 27 are rotated with their inner peripheries moving downwardly, as indicated by the arrows in Figs. 4 and 7, and as each wiener enters between the wheels, they will move outwardly against the yielding pressure of the springs 71 to accommodate the wiener, as shown in Fig. 6, while pressing inwardly tightly against the casing.

When the wiener moves downwardly between the wheels until its lower end is opposite the upper ends of the vacuum grooves 52 in the air cylinders, suction will be applied to the open end of the casing C simultaneously from all four wheels acting at 90° to each other, and as the wiener continues to move downwardly, the suction will be applied progressively throughout the entire length of the casing with the result that the casing will be split into four longitudinal strips or ribbons C' which will cling to and wrap around the rotating wheels 27 in the manner indicated in Fig. 7, and accordingly the casing will be peeled from the wiener when it drops from the wheels into a receiving tube 76, the upper flared end 76a of which is positioned just below the wheels in vertical alignment with the tube 74. The tube 76 conducts the skinned wiener downwardly and then outwardly between a pair of the arms 15 to a suitable conveyer or the like (not shown).

It will be observed that since the transverse slots 47 in the peripheries of the wheels die out or merge with the grooved peripheries at their edges, the vacuum will be applied throughout the width of each slot so that the casing is subjected to suction at four arcuate zones making up substantially the entire circumference of the casing, with the exception of narrow parting strips between the wheels. Due to the fact that the suction is radially outward at these four zones, the cellophane will peel off in four substantially equal strips lengthwise of the wiener. It may be desirable to first apply the cellophane so that its "grain" runs lengthwise of the wieners, because it is well known that cellophane will tear more easily with the grain than crosswise of it. It may also be desirable to provide intermittent cutting means (not shown) ahead of the feeding tube 74 for slicing lengthwise in two directions at right angles through the necks of the cellophane between wieners, so that when the wieners are cut apart at the necks, the open end of the casing will have its edges initially cut so as to facilitate the peeling of the four ribbons from the wiener. Obviously, such intermittent cutting means would be designed to cut through the necks of the casings only without touching the wieners themselves.

As shown in Figs. 7 and 8, as the wiener W passes downwardly between the wheels 27, the cellophane casing C is peeled off in four ribbons or strips C' and these strips are held against the outer peripheries of the wheels 27 by suction and pulled outwardly away from the wiener. As the lower ends of the strips C' follow around the rotating wheels 27, the slots 47 thereunder become cut off from the vacuum groove 52 and then almost immediately connected to the air pressure groove 53 so that the strips C' are blown radially outward from the wheels when they reach an outward position such as shown in Fig. 7 where substantially all of the slots 47 under the strips are blowing air supplied from the groove 53. Thus, the detaching of the strips from the peeling wheels 27 is insured so that the wheels are clean and ready to peel another wiener during their next rotation. If desired, other suitable collecting means may be provided for catching and collecting the strips C' as they are blown from the wheels.

Due to the fact that the upper end of the vacuum groove 52 is connected with the vacuum supply groove 58, the greatest vacuum is applied to the groove 47 directly at the tangential point of the peeling wheels 27, so that the greatest vacuum is applied to the open end 75 of the wiener casing to initiate the tearing or peeling of the strips C'. Likewise, the lower end of the air groove 53 is connected to the supply duct 61 so that the greatest blowing pressure is exerted on the forward end of the strip C' to initiate its separation from the periphery of the wheel.

The present improved machine provides for stripping cellophane casings from wieners and like products without requiring injecting air into the casings or scoring or slitting the casings lengthwise of the wieners, so that the surface of the skinned wieners is not marred or damaged in any way. Moreover, the improved machine is compact and relatively inexpensive to construct as compared with prior machines, and requires no difficult or fine adjustments to insure its successful operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful methods and constructions, and reasonable mechanical equivalents thereof obvious to those skilled in the art, are set forth in the appended claims.

I claim:

1. In apparatus for removing casings from wieners and the like, said casings having their necks at one end pre-cut at four circumferentially spaced points, a housing, four radially disposed wheels mounted on the housing having grooved peripheries simultaneously rollably engaging substantially the entire circumference of a wiener passing between the wheels, each wheel having a plurality of radial ducts communicating at one end with is grooved periphery and terminating at the other end in ports arcuately arranged in one outer surface, and an air cylinder on said housing for each wheel having a flat surface slidably abutting said outer surface and having an arcuate vacuum groove communicating with a group of said ports, whereby suction is applied simultaneously to peripheral portions of the wheels to peel adjoining longitudinal strips of the casing from the wiener during rotation of the wheels.

2. In apparatus for removing casings from wieners and the like, said casings having their necks at one end pre-cut at four circumferentially spaced points, a housing, four radially disposed wheels mounted on the housing having grooved peripheries simultaneously rollably engaging substantially the entire circumference of a wiener passing between the wheels, each wheel having a plurality of radial ducts communicating at one end with its grooved periphery and terminating at the other end in ports arcuately arranged in one outer surface, and an air cylinder on said housing for each wheel having a flat surface slidably abutting said outer surface and having an arcuate vacuum groove communicating with a group of said ports and an arcuate air blast groove communicating with another group of said ports, whereby suction is applied simultaneously to peripheral portions of the wheels to peel adjoining longitudinal strips of the casing from the wiener during a partial rotation of the wheels and an air blast is applied to said peripheral portions during a subsequent partial rotation of the wheels to blow said strips outwardly therefrom.

3. In apparatus for removing casings from wieners and the like, said casings having their necks at one end pre-cut at four circumferentially spaced points, a housing, four radially disposed wheels mounted at right angles to each other on the housing and having grooved peripheries for simultaneously rollably engaging substantially the entire circumference of a wiener passing between the wheels, said wheels having radial ducts extending from their grooved peripheries to one face thereof, an air cylinder movably abutting each said wheel face and having ports selectively communicating with said radial ducts, means operatively associated with said wheels rotating said wheels simultaneously relative to said cylinders to propel a wiener through the wheels, air exhausting means connected to certain of said cylinder ports for simultaneously peeling for adjoining longitudinal casing strips from the wiener during a partial rotation of the wheels, and means operatively associated with said wheels for dislodging casing strips from the wheels during a subsequent partial rotation of the wheels.

4. In apparatus for removing casings from wieners and the like, said casings having their necks at one end pre-cut at four circumferentially spaced points, a housing, four radially disposed wheels at right angles to each other and having grooved peripheries simultaneously rollably engaging substantially the entire circumference of a wiener passing between the wheels, vertical arms each journaling one of said wheels at its upper end and pivoted at its lower end on the housing for radial movement of the wheels toward and away from each other, said wheels having radial ducts extending from their grooved peripheries to one face thereof, an air cylinder movably abutting each said wheel face and having ports selectively communicating with said radial ducts, means operatively associated with said wheels rotating said wheels simultaneously relative to said cylinders to propel a wiener through the wheels, air exhausting means connected to certain of said cylinder ports for simultaneously peeling for adjoining longitudinal casing strips from the wiener during a partial rotation of the wheels, means operatively associated with said wheels for dislodging casing strips from the wheels during a subsequent partial rotation of the wheels.

5. In apparatus for removing casings from wieners and the like, said casings having their necks at one end pre-cut at four circumferentially spaced points, a housing, four radially disposed wheels at right angles to each other and having grooved peripheries simultaneously rollably engaging substantially the entire circumference of a wiener passing between the wheels, vertical arms each journaling one of said wheels at its upper end and pivoted at its lower end on the housing for radial movement of the wheels toward and away from each other, each of said arms being movably connected to an adjacent arm for right angular movement relative thereto, said wheels having radial ducts extending from their grooved peripheries to one face thereof, an air cylinder movably abutting each said wheel face and having ports selectively communicating with said radial ducts, means operatively associated with said wheels rotating said wheels simultaneously relative to said cylinders to propel a wiener through the wheels, air exhausting means connected to certain of said cylinder ports for simultaneously peeling four adjoining longitudinal casing strips from the wiener during a partial rotation of the wheels, and means operatively associated with said wheels for dislodging casing strips from the wheels during a subsequent partial rotation of the wheels.

6. In apparatus for removing casings from wieners and the like, said casings having their necks at one end pre-cut at four circumferentially spaced points, a housing, four radially disposed wheels at right angles to each other and having grooved peripheries simultaneously rollably engaging substantially the entire circumference of a wiener passing between the wheels, vertical arms each journaling one of said wheels at its upper end and pivoted at its lower end on the housing for radial movement of the wheels toward and away from each other, each of said arms being movably connected to an adjacent arm for right angular movement relative thereto, spring means associated with said arms yieldingly resisting said right angular movement of the arms in either direction, said wheels having radial ducts extending from their grooved peripheries to one face thereof, an air cylinder movably abutting each said wheel face and having ports selectively communicating with said radial ducts, means operatively associated with said wheels rotating said wheels simultaneously relative to said cylinders to propel a wiener through the wheels, air exhausting means connected to certain of said cylinder ports for simultaneously peeling four adjoining longitudinal casing strips from the wiener during a partial rotation of the wheels, and means operatively associated with said wheels for dislodging casing strips from the wheels during a subsequent partial rotation of the wheels.

7. In apparatus for removing casings from wieners and the like, said casings having their necks at one end pre-cut at four circumferentially spaced points, a housing, four radially disposed wheels at right angles to each other and having grooved peripheries simultaneously rollably engaging substantially the entire circumference of a wiener passing between the wheels, vertical arms each journaling one of said wheels at its upper end and pivoted at its lower end on the housing for radial movement of the wheels toward and away from each other, said wheels having radial ducts extending from their grooved peripheries to one face thereof, an air cylinder movably abutting each said wheel face and having ports selectively communicating with said radial ducts, means operatively associated with said wheels rotating said wheels simultaneously relative to said cylinders to propel a wiener through the wheels, air exhausting means connected to certain of said cylinder ports for simultaneously peeling four adjoining longitudinal casing strips from the wiener during a partial rotation of the wheels, means operatively associated with said wheels for dislodging casing strips from the wheels during a subsequent partial rotation of the wheels, and means on said housing for conducting skinned wieners downwardly and outwardly between said vertical arms.

8. In apparatus for removing casings from wieners and the like, said casings having their necks at one end pre-cut at four circumferentially spaced points, a housing, four radially disposed wheels mounted at right angles to each other on the housing and having grooved peripheries for simultaneously rollably engaging substantially the entire circumference of a wiener passing between the wheels, said wheels having radial ducts extending from their grooved peripheries to one face thereof, an air cylinder movably abutting each said wheel face and having ports selectively communicating with said radial ducts, means operatively associated with said wheels rotating said wheels simultaneously relative to said cylinders to propel a wiener through the wheels, and air exhausting means connected to certain of said cylinder ports for simultaneously peeling four adjoining longitudinal casing strips from the wiener during a partial rotation of the wheels.

JOSEPH J. FEDEVICH.

References Cited in the file of this patent

UNITED STATES PATENTS

| Number | Name | Date |
|---|---|---|
| 2,463,157 | Deitrickson | Mar. 1, 1949 |